(12) United States Patent
Fogel et al.

(10) Patent No.: US 7,084,876 B1
(45) Date of Patent: Aug. 1, 2006

(54) METHOD FOR PRESENTING A VIRTUAL REALITY ENVIRONMENT FOR AN INTERACTION

(75) Inventors: David B. Fogel, San Diego, CA (US); Douglas R. Johnson, San Diego, CA (US); Timothy J. Hays, La Jolla, CA (US)

(73) Assignee: Digenetics, Inc., La Jolla, CA (US)

( * ) Notice: Subject to any disclaimer, the term of this patent is extended or adjusted under 35 U.S.C. 154(b) by 369 days.

(21) Appl. No.: 10/623,034

(22) Filed: Jul. 18, 2003

Related U.S. Application Data

(60) Provisional application No. 60/431,679, filed on Dec. 7, 2002.

(51) Int. Cl.
*G06T 13/00* (2006.01)
(52) U.S. Cl. .......................... 345/473; 463/32; 715/706
(58) Field of Classification Search ................ 345/473; 463/2, 14, 32; 715/758, 706
See application file for complete search history.

(56) References Cited

U.S. PATENT DOCUMENTS

| | | | | |
|---|---|---|---|---|
| 4,766,541 | A * | 8/1988 | Bleich et al. .................. | 463/31 |
| 5,682,469 | A * | 10/1997 | Linnett et al. ............... | 345/473 |
| 6,168,519 | B1 * | 1/2001 | Nakagawa et al. ............ | 463/4 |
| 6,600,491 | B1 * | 7/2003 | Szeliski et al. ............. | 345/473 |
| 6,676,518 | B1 * | 1/2004 | Sawa et al. .................... | 463/31 |
| 6,798,426 | B1 * | 9/2004 | Tateishi ....................... | 715/706 |

FOREIGN PATENT DOCUMENTS

JP         10201954 A  *  8/1998

OTHER PUBLICATIONS

Arno Schödl, Richard Szeliski, David H. Salesin, Irfan Essa, "Video textures," Jul. 2000, Proceedings of the 27th Annual Conference on Computer Graphics and Interactive Techniques, p. 489-498.*
Stephen Pollard, Sean Hayes, "3D Video Sprites," Feb. 1998, HPL-98-25, HP Labs Technical Report.*
Fogel, David, declaration, Aug. 4, 2004, 4 pages plus Exhibits A, B, C, D, E, F, G, H.

(Continued)

*Primary Examiner*—Ulka Chauhan
*Assistant Examiner*—Jason M. Repko
(74) *Attorney, Agent, or Firm*—Timothy N. Ellis

(57) ABSTRACT

One aspect of the invention is a method for presenting a virtual reality setting for an interaction. An example of the method includes presenting a streaming video of a real-world background scene, and presenting a series of individual video clips that are joined into the appearance of a continuous streaming image of a real-world character. The method also includes inputting an operator's choice of action or inaction, and updating a current state based on the operator's action or inaction. The method further includes using the current state by a decision logic to determine a response in the setting by the character, and using the current state by the decision logic to determine a selection of how to control video of the character and how to control video of the background. The method may also include simultaneously presenting a three-dimensional representation and a two-dimensional representation of a playing area.

88 Claims, 2 Drawing Sheets

OTHER PUBLICATIONS

"Evolutionary Checkers starring Blondie 24: Checkers with an Attitude!", product brochure, Dec. 20, 2001, 1 page, Digenetics, San Diego, (Exhibit A of Fogel Declaration).

"Digital Strip Poker", screen shot, 1999, 1 page, Slickrock Software (www.slickrocksoftware.com), (Exhibit B of Fogel Declaration).

"Digital Strip Poker", screen shot, 1999, 1 page, Slickrock Software (www.slickrocksoftware.com), (Exhibit C of Fogel Declaration).

"Virtual Sex with Nikki Tyler", DVD Cover (front and back), 1999, 1 page, Digital Playground, Chatsworth, (Exhibit D of Fogel Declaration).

"Virtual Sex with Nikki Tyler", 1999, page from instruction guide, Digital Playground, Chatsworth, (Exhibit E of Fogel Declaration).

"Virtual Sex with Nikki Tyler", 1999, page from instruction guide, Digital Playground, Chatsworth, (Exhibit F of Fogel Declaration).

"My Plaything" (Sylvia Saint), screen shot, 1 page, Digital Sin, Chatsworth (www.digitalsindvd.com), (Exhibit G of Fogel Declaration).

"My Plaything" (Sylvia Saint), screen shot, 1 page, Digital Sin, Chatsworth (www.digitalsindvd.com), (Exhibit H of Fogel Declaration).

* cited by examiner

METHOD FOR PRESENTING A VIRTUAL REALITY ENVIRONMENT FOR AN INTERACTION

CROSS-REFERENCE TO RELATED APPLICATION

This application claims the benefit of U.S. Provisional Patent Application No. 60/431,679, filed Dec. 7, 2002, titled, "Video display that generates an experience in a virtual reality", which is incorporated herein by this reference.

BACKGROUND

1. Technical Field

The present invention relates to presenting a scene on a display. More particularly, the invention concerns presenting a virtual reality setting for an interaction on a computer/video display.

2. Description of Related Art

Various types of computer-based games and entertainment products are widely known. For example, software products for playing games on computers, such as chess, checkers, Monopoly®, and Risk®, as well as software entertainment products that feature video performers, are generally available.

Computer-based games often display an icon or figure that represents a player of the game, a board that shows the locations of playing pieces, and a background. Frequently it is desirable to make the player or players, and the background, appear as realistic as possible. However, backgrounds for games typically are monochrome or a simple drawing, and players are typically represented by icons or drawn figures. These representations of backgrounds and players lack realism because they are merely artist's renditions. Additionally, the behavior of computer-generated players in games and performers in entertainment products has generally been limited and unrealistic.

The playing area for computer-based games is typically displayed as a two-dimensional top-down view of a playing board, or as a three-dimensional angled view of the board. However, both views cannot be displayed simultaneously, and the three-dimensional view does not facilitate easy interpretation of the game situation by a human operator.

In summary, previously known techniques are inadequate for realistically displaying real-world representations of a background and a player or performer in a virtual-reality environment. Additionally, previously known games do not have the capability to portray a playing area, such as a playing board, in a realistic and easily interpreted manner in a virtual-reality environment.

SUMMARY

An example of one aspect of the invention is a method for presenting and controlling a digital background for a real-world setting in a computer display. The method includes presenting a background, and inputting an operator's choice of action or inaction to a situation state module. The method also includes updating a current state based on the operator's action or inaction, and using the current state by a decision logic to determine how to control the background in the setting.

An example of another aspect of the invention is a method for presenting a character for an interaction. The method includes presenting a series of individual video clips that are joined into the appearance of a continuous streaming image of the character, and inputting an operator's choice of action or inaction. The method also includes updating a current state based on the operator's action or inaction, and using the current state by a decision logic to determine a response in a setting by the character, and modifying the character.

An example of another aspect of the invention is a method for presenting a virtual reality setting for transferring information pertaining to a gaming situation to a human operator. The method includes presenting a three-dimensional representation of a playing area. The method also includes presenting a two-dimensional representation of the playing area, wherein the three-dimensional representation and the two-dimensional representation are presented on a single video screen to allow an operator to simultaneously observe action in both two and three dimensions.

An example of another aspect of the invention is a method for presenting a digital environment for an interaction. The method includes presenting a background, and setting a character against the background. The method additionally includes presenting a three-dimensional representation of a playing area, and also includes presenting a two-dimensional representation of the playing area.

An example of another aspect of the invention is a method for presenting a virtual reality setting for an interaction. The method includes presenting a background, and setting a character against the background. The method also includes inputting an operator's choice of action or inaction, and updating a current state based on the operator's action or inaction. The method further includes using the current state by a decision logic to determine a response in the setting by the character, and modifying the character using a library of videos.

An example of another aspect of the invention is a method for presenting a virtual reality environment for an interaction. The method includes presenting a streaming video of a real-world background scene, and presenting a series of individual video clips that are joined into the appearance of a continuous streaming image of a real-world character. The method further includes inputting an operator's choice of action or inaction, and updating a current state based on the operator's action or inaction. Additionally, the method includes using the current state by a decision logic to determine a response by the character, and modifying the character.

An example of another aspect of the invention is a method for presenting a virtual reality setting for an interaction. The method includes presenting a streaming video of a real-world background scene, and presenting a series of individual video clips that are joined into the appearance of a continuous streaming image of a real-world character. The method also includes inputting an operator's choice of action or inaction, and updating a current state based on the operator's action or inaction. The method further includes using the current state by a decision logic to determine a response in the setting by the character, and using the current state by the decision logic to determine a selection of how to control video of the character and how to control video of the background. Other aspects of the invention are described in the sections below.

The invention provides a number of advantages. For example, the invention advantageously provides the illusion of immersing a human operator in a real-world scene where a game (or other interaction) is played, while displaying a playing area in an easily interpreted manner. The invention also provides a number of other advantages and benefits, which should be apparent from the following description.

DETAILED DESCRIPTION

The nature, objectives, and advantages of the invention will become more apparent to those skilled in the art after considering the following detailed description in connection with the accompanying drawings.

This invention relates to the use of a digital background in a video/computer environment that gives the illusion of the human operator(s)/player(s) being immersed in a real-world scene where the game is being played through the use of 1) a continuous streaming video or animated character(s) set against a digital background, 2) "triggers" to control the video or animated character to respond continuously to situations in a game or to the time between moves or other facets related to the human operator's/player's actions or inactions, 3) a simultaneous juxtaposition of a three-dimensional view of a playing board, as would be seen in real life, and a two-dimensional view of the same playing board overlaid on the background scene, with the potential for said top-down view to be see-through, allowing the player to continue to feel immersed in the scene.

Figure 1:
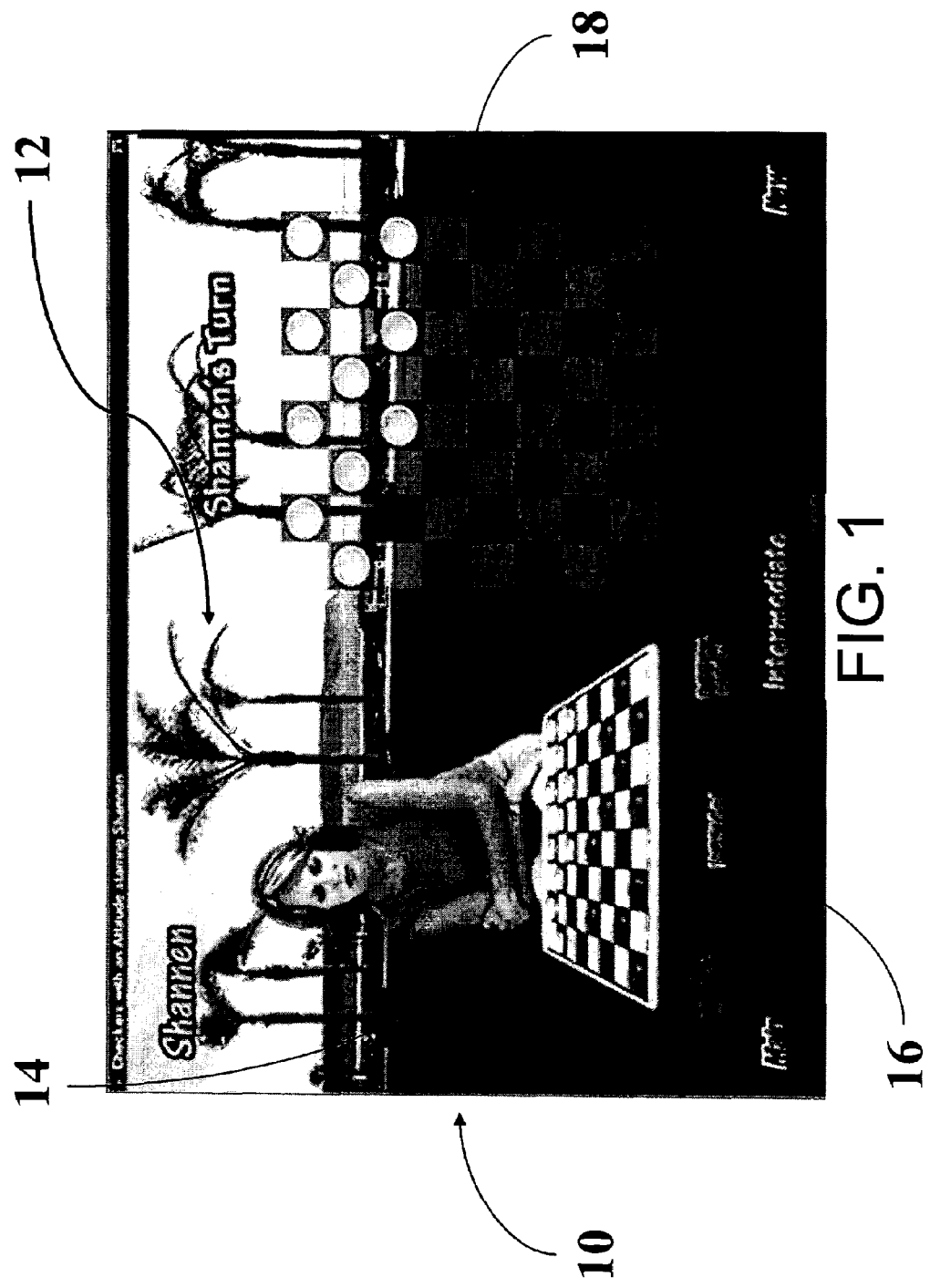
FIG. 1 shows a video display that simulates a life-like experience in accordance with an example of the invention.

FIG. 1 shows the invention of a video display that simulates a life-like experience.

Figure 2:
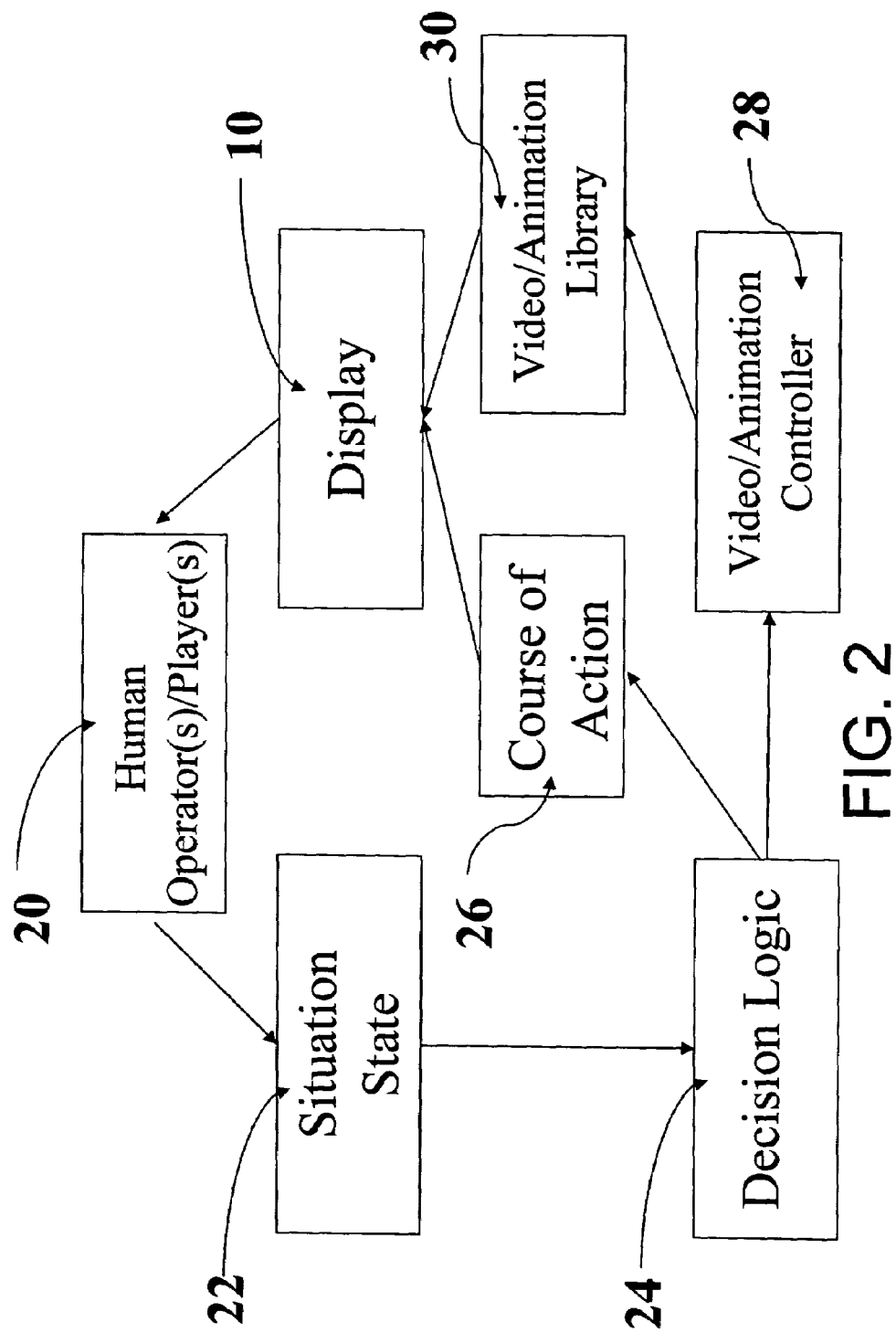
FIG. 2 shows the procedure for software designed to operate a video display in a continuous fashion, in accordance with an example of the invention.

FIG. 2 shows the procedure for software designed to operate the video display in a continuous fashion.

REFERENCE NUMERALS IN DRAWINGS

10 Video interface for visual information transmission from a machine to a human operator (also called a "display")
12 Digital background for real-world setting
14 Animated/video character
16 Three-dimensional view of the playing arena
18 See-through two-dimensional view of the playing arena
20 Human operator/player
22 Situation state of the digital environment
24 Decision logic relating situation triggers to courses of action and videos/animations
26 Course of action
28 Video/animation controller
30 Library of videos/animations

DESCRIPTION—FIG. 1 & FIG. 2—PREFERRED EMBODIMENT

A preferred embodiment of the present invention is illustrated in FIG. 1 and FIG. 2. A means for visual transmission of information from a video interface 10 of any kind is presented to a human operator(s)/player(s) 20. A digital background 12 is presented in the screen/display 10 such that the human operator(s)/player(s) 20 have the feeling of being immersed in a virtual reality setting where a game or other interaction takes place. Continuously streaming video of the background 12 and a video/animated character 14, where video is of any kind and animation can be of cartoon, cell, or clay, or other medium, set against the digital background 12 provides a greater illusion of virtual reality. "Triggers" control the video/animated character 14 to respond in a continuous fashion to game situations including actions and inaction by the human opponent. The simultaneous juxtaposition of a three-dimensional representation of a playing board or arena 16, as would be observed by a human in reality, together with a two-dimensional representation of said playing board 18 or arena using top-down view provides additional utility to the human operator(s)/player(s) 20. The two-dimensional view 18 can be transparent and is overlaid on the background scene 12 and therefore does not interfere with the feeling of being immersed in a virtual reality setting. The preferred embodiment of the internal video controller 28 is illustrated in FIG. 2. Human operator(s)/player(s) 20 view a video display 10. Action or inaction on the part of the human operator(s)/player(s) 20 affects the situation state of the digital environment 22 that is to be presented on the display 10. A decision logic 24 relating current situation and triggers to course of action and videos/animations is used to determine the most appropriate update to the digital environment. The decision logic 24 can take the form of a computer algorithm. Following appropriate decision logic, courses of action 26 can be presented to the display 10 for human interpretation or the decision logic 24 can interact with a video controller 28 to modify the character(s) 14 or background(s) 12 in the digital environment. The video controller 28 can either make a direct change to the character 14 on the display 10 or make use of a library of potential videos/animations 30 for a broader range of realistic variations. The video display 10 is updated and the process is repeated in a continuous fashion during the interaction with human operator(s)/player(s) 20.

Operation—FIG. 1

Using a computer screen or video monitor, information pertaining to a gaming situation is transferred to human operator(s)/player(s) 20. The gaming situation is designed to be realistic by the inclusion of a digital background 12 that provides the illusion of the human operator(s)/player(s) 20 being immersed in a real-world environment during game play. The digital background 12 can be provided by several means including continuous streaming video or a series of concatenated still pictures generated to provide life-like movement in the background. A video/animated character 14 opponent is set within this digital background 12 providing the illusion of in-person gaming. A series of "triggers" controls the video/animation of the character 14 with responses that are continuous and different depending on the game situation. These responses include movements both during and between moves of the character 14 and the human operator(s)/player(s) 20. These triggers include but are not limited to the human operator's/player's 20 sequence of moves during the game, and resulting strategic position during the game. The addition of a character video/animation 14 to a digital realistic background 12 with motion of the character 14 in a time-dependent manner based on the interaction with the human operator(s)/player(s) 20 with motion of the background 12 in a realistic and continuous manner provides a means to simulate a life-like experience.

In the context of gaming within this virtually realistic digital environment, a three-dimensional view 16 of the gaming arena/playing board is shown as would be seen in real-life from a player's perspective. A two-dimensional view 18 of the same playing board, using a top-down view, showing all corresponding movement from the game in the three-dimensional view 16 in both time and space provides a method for human interaction with the digital environment for ease of interpretation by the human operator(s)/player(s)

20. The two-dimensional top-down view 18 positioned in front of the digital background 12, can be transparent and therefore facilitates the human operator(s)/player(s) 20 to continue to feel as though they are immersed in the digital environment.

Operation-FIG. 2

Human operator(s)/player(s) 20 take the role of a player or other participant in a game or setting. The operator 20 observes the display 10, which provides information on the current situational state, and depicts the video/animation of at least one other character 14 in game or setting, as well as the background 12 display, and the state of the game or setting itself (for example, the positions of pieces on a playing board). The operator 20 chooses a suitable course of action, such as moving a piece or pieces in a game but may also include waiting (that is, remaining inactive). The operator's 20 choice of action or inaction is input to a situation state 22 module that updates the current setting based on the operator's 20 action or inaction. This state 22 is then used by a decision logic 24 to determine both a response in the game or setting by any computer-controlled opponent or player, as well as the selection of how to control the video or animation on the screen, which may include both the computer-controlled opponent(s) or other player(s), as well as other background scenery or other elements of the setting. The course of action and the selection of video display are put in place and sent to the display 10 mechanism to be shown to the human operator 20.

The invention may also be referred to as a video display that generates an experience in a virtual reality. The following entries describe examples of various aspects the invention:

Entry 1. The method of representation for a real-world settings as a digital background in a computer/video display comprising
a) a still picture or continuously streaming video of said real-world setting
b) a means to control the video to present changes within the context of a real-world setting.

Entry 2. The method of representation for a real-world potential opponent or other player as an animated or video character in a computer/video display comprising
a) continuously streaming video or animation of said real-world potential opponent.
b) a series of individual video or animation clips that are joined into the appearance of a continuous streaming image.

Entry 3. The combination of entry 1 and entry 2 within the context of a gaming situation for use of transmission of information regarding the game to a human operator/player to provide the illusion of in-person gaming.

Entry 4. The method of triggers to control the video in entry 2 such that the animated or video character responds continuously to situations presented by entry 3 due to situations in a game or to the time between moves or other facets related to the human operator/player's actions or inactions.

Entry 5. The method of representation for a real-world setting by comprising of
a) a three-dimensional view of a gaming situation from a side view as would be seen in real life.
b) a two-dimensional view of a gaming situation from a top-down view, with said view having the potential for being see-through Entry 6. The combination of entries 5a and 5b on a single video screen allowing the human operator/player to feel immersed in the scene and simultaneously observe all action in both two- and three-dimensions.

OTHER EMBODIMENTS

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

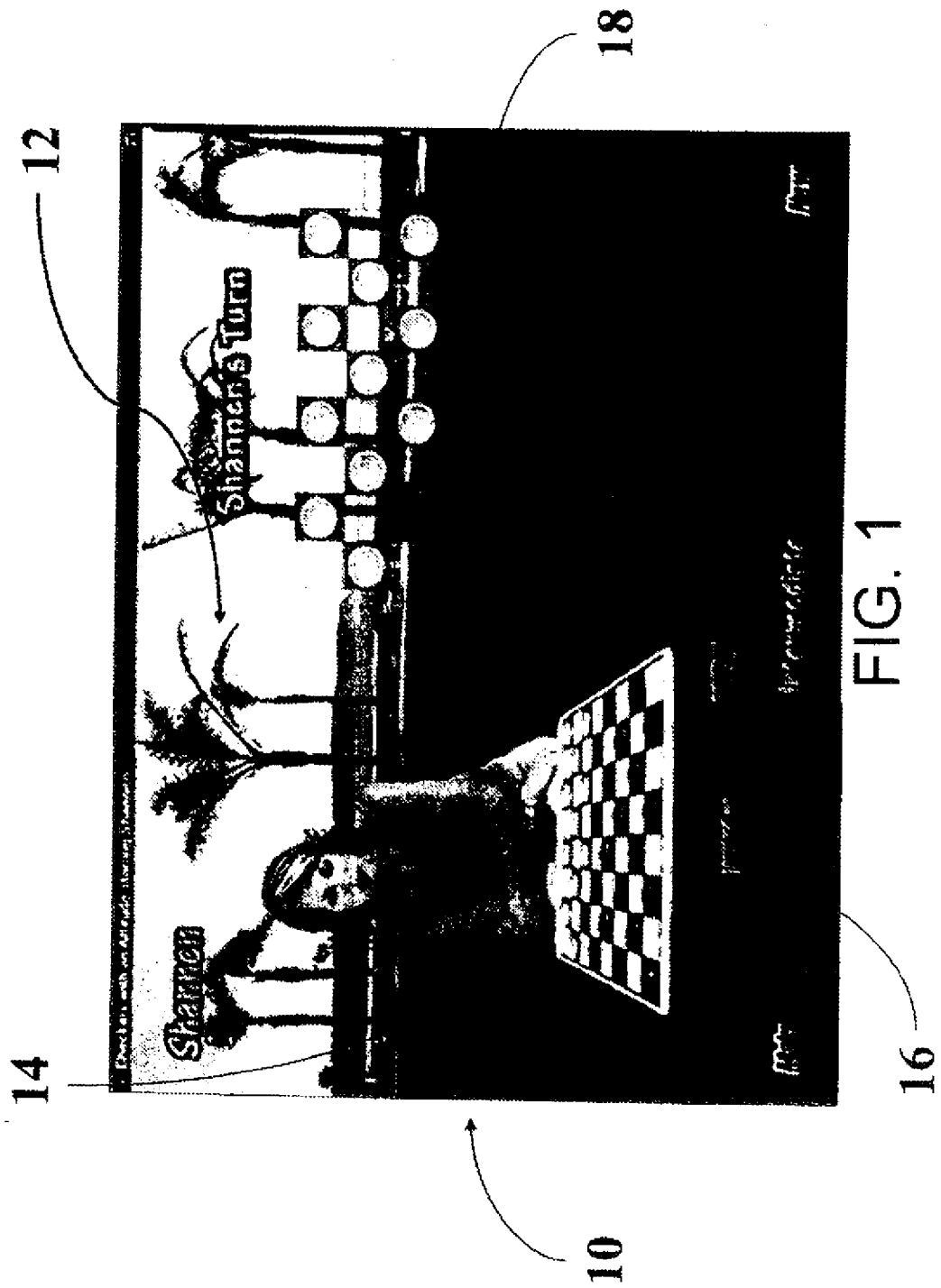

What is claimed is:

1. A method for presenting a virtual reality setting for an interaction, the method comprising the following operations:
presenting on a display a series of concatenated pictures of the real world to provide a real world background scene having life-like movement;
presenting on the display a series of video clips of a real person, wherein the series of video clips present the appearance of a continuous and moving image of the real person on the display; wherein the series of video clips of the real person are presented on the display contiguous with the real world background scene and completely within outside edges of the real world background scene on the display;
presenting on the display a three-dimensional representation of a playing area, wherein the three-dimensional representation of the playing area is presented on the display contiguous with the real world background scene and completely within the outside edges of the real world background scene on the display;
presenting on the display a two-dimensional representation of the playing area, wherein the two-dimensional representation of the playing area is presented on the display contiguous with the real world background scene and completely within the outside edges of the real world background scene on the display, and wherein the two-dimensional representation of the playing area is partially transparent to permit viewing a portion of the real world background scene through the two-dimensional representation of the playing area;
wherein the series of video clips of the real person, and the three-dimensional representation of the playing area, and the two-dimensional representation of the playing area are presented in separate nonoverlapping areas within the outside edges of the real world background scene;
wherein the real world background scene and the series of video clips of the real person and the three-dimensional representation of the playing area and the two-dimensional representation of the playing area are visible substantially simultaneously on the display;
inputting an operator's choice of action or inaction to a situation state module;
updating a current state based on the operator's action or inaction; and
using the current state by a decision logic to determine how to control the real world background scene.

2. The method of claim 1, further comprising the operation of sending a selection of control of the real world background scene to the display.

3. The method of claim 2, further comprising the operation of interacting with a video controller to modify the real world background scene after utilizing the decision logic.

4. The method of claim 3,
wherein the two-dimensional representation of the playing area and the three-dimensional representation of the playing area show a same state of the interaction, and wherein the two-dimensional representation of the playing area shows all movement shown in the three-dimensional representation of the playing area.

5. The method of claim 4,
wherein the series of video clips of the real person are presented on the display contiguous with a portion of the three-dimensional representation of the playing area.

6. The method of claim 5, further comprising the following operations:
using the current state by the decision logic to determine a response in the virtual reality setting by the image of the real person; and
modifying the image of the real person on the display.

7. The method of claim 6,
wherein the three-dimensional representation of the playing area and the two-dimensional representation of the playing area are not contiguous on the display.

8. The method of claim 7,
further comprising presenting words on the display completely within the outside edges of the background scene on the display.

9. The method of claim 8, further comprising the operations of:
using the current state by the decision logic to determine a response by the image of the real person on the display; and
modifying the image of the real person on the display.

10. The method of claim 9,
wherein the two-dimensional representation of the playing area shows all corresponding movement in both time and space from a game shown in the three-dimensional representation of the playing area.

11. A method for presenting a virtual reality setting for an interaction, the method comprising the following operations:
presenting on a display a series of concatenated pictures of the real world to provide a real world background scene having life-like movement;
presenting on the display a series of video clips of a real person, wherein the series of video clips present the appearance of a continuous and moving image of the real person on the display, wherein the series of video clips of the real person are presented on the display contiguous with the real world background scene and completely within outside edges of the real world background scene on the display;
presenting on the display a three-dimensional representation of a playing area, wherein the three-dimensional representation of the playing area is presented on the display contiguous with the real world background scene and completely within the outside edges of the real world background scene on the display;
presenting on the display a two-dimensional representation of the playing area, wherein the two-dimensional representation of the playing area is presented on the display contiguous with the real world background scene and completely within the outside edges of the real world background scene on the display, and wherein the two-dimensional representation of the playing area is partially transparent to permit viewing a portion of the real world background scene through the two-dimensional representation of the playing area;
wherein the series of video clips of the real person, and the three-dimensional representation of the playing area, and the two-dimensional representation of the playing area are presented in separate nonoverlapping areas within the outside edges of the real world background scene;
wherein the real world background scene and the series of video clips of the real person and the three-dimensional representation of the playing area and the two-dimensional representation of the playing area are visible substantially simultaneously on the display;
inputting a human operator's choice of action or the operator's inaction;
updating a current state based on the operator's action or inaction;
using the current state by a decision logic to determine a response by the image of the real person presented on the display; and
modifying the image of the real person presented on the display.

12. The method of claim 11, further comprising the operation of controlling the image of the real person presented on the display in response to situations in a game.

13. The method of claim 12, further comprising the operation of controlling the image of the real person presented on the display in response to the time between moves by the human operator.

14. The method of claim 13, further comprising the operation of providing motion of the image of the real person presented on the display in a time-dependent manner based on interaction with the human operator.

15. The method of claim 14, further comprising the operation of using a series of triggers to control the image of the real person presented on the display with responses that are different depending on a game situation.

16. The method of claim 15, further comprising the operation of using a series of triggers to control the image of the real person presented on the display with responses that are different depending on a game situation, and that are continuous, wherein the responses include movements both during and between game moves of the image of the real person presented on the display and the human operator.

17. The method of claim 16, further comprising the operation of using a series of triggers for controlling the image of the real person presented on the display in response to game situations, wherein the game situations include actions and inaction by the human operator, and include the time between moves by the human operator.

18. The method of claim 17, further comprising the operation of using triggers to control responses of the image of the real person presented on the display, wherein the triggers include the human operator's sequence of moves during a game.

19. The method of claim 18, further comprising the operation of using triggers to control responses of the image of the real person presented on the display, wherein the triggers include the human operator's strategic position in a game.

20. The method of claim 19, wherein the operation of modifying the image of the real person presented on the display comprises interacting decision logic with a video controller.

21. The method of claim 20, wherein the operation of modifying the image of the real person presented on the display comprises making a direct change to the image of the real person presented on the display.

22. The method of claim 20, wherein the operation of modifying the image of the real person presented on the display comprises using a library of videos.

23. The method of claim 22, wherein the image of the real person presented on the display is an opponent in a game.

24. The method of claim 23,
wherein the two-dimensional representation of the playing area and the three-dimensional representation of the playing area show a same state of the interaction, and wherein the two-dimensional representation of the playing area shows all movement shown in the three-dimensional representation of the playing area.

25. The method of claim 24, further comprising the following operations:
using the current state by the decision logic to determine how to control the real world background scene; and
sending a selection of control of the real world background scene to the display.

26. The method of claim 25,
wherein the two-dimensional representation of the playing area and the three-dimensional representation of the playing area include the positions of playing pieces on a playing board representing the state of the game.

27. The method of claim 26,
wherein the three-dimensional representation of the playing area and the two-dimensional representation of the playing area are not contiguous.

28. The method of claim 27,
wherein the series of video clips of the real person are presented on the display contiguous with a portion of the three-dimensional representation of the playing area.

29. The method of claim 28,
wherein the operations further comprise, the human operator moving one of the playing pieces in the game.

30. A method for presenting a virtual reality setting for an interaction, the method comprising the following operations:
presenting on a display a series of concatenated pictures of the real world to provide a real world background scene having life-like movement;
presenting on the display a series of animation clips of a character, wherein the series of animation clips present the appearance of a continuous and moving animated character on the display; wherein the series of animation clips of the character are presented on the display contiguous with the real world background scene and completely within outside edges of the real world background scene on the display;
presenting on the display a three-dimensional representation of a playing area, wherein the three-dimensional representation of the playing area is presented on the display contiguous with the real world background scene and completely within the outside edges of the real world background scene on the display;
presenting on the display a two-dimensional representation of the playing area, wherein the two-dimensional representation of the playing area is presented on the display contiguous with the real world background scene and completely within the outside edges of the real world background scene on the display, and wherein the two-dimensional representation of the playing area is partially transparent to permit viewing a portion of the real world background scene through the two-dimensional representation of the playing area;
wherein the series of animation clips of the character, and the three-dimensional representation of the playing area, and the two-dimensional representation of the playing area are presented in separate nonoverlapping areas within the outside edges of the real world background scene;
wherein the real world background scene and the series of animation clips of the character and the three-dimensional representation of the playing area and the two-dimensional representation of the playing area are visible substantially simultaneously on the display;
inputting an operator's choice of action or the operator's inaction;
updating a current state based on the operator's action or inaction;
using the current state by a decision logic to determine a response in a setting by the character; and
modifying the character.

31. The method of claim 30, wherein the operation of modifying the character comprises using a library of animations.

32. The method of claim 30, wherein the animation is cell animation.

33. The method of claim 30, wherein the animation is clay animation.

34. The method of claim 31, further comprising the operation of using the current state by the decision logic to determine how to control the real world background scene.

35. The method of claim 34,
wherein the two-dimensional representation of the playing area and the three-dimensional representation of the playing area show a same state of the interaction, and wherein the two-dimensional representation of the playing area shows all movement shown in the three-dimensional representation of the playing area.

36. A method for presenting a virtual reality setting for an interaction, the method comprising the following operations:
presenting on a display a series of concatenated pictures of the real world to provide a real world background scene having life-like movement;
presenting on the display a series of video clips of a real person, wherein the series of video clips present the appearance of a continuous and moving image of the real person on the display; wherein the series of video clips of the real person are presented on the display contiguous with the real world background scene and completely within outside edges of the real world background scene on the display;
presenting on the display a three-dimensional representation of a playing area, wherein the three-dimensional representation of the playing area is presented on the display contiguous with the real world background scene and completely within the outside edges of the real world background scene on the display;
presenting on the display a two-dimensional representation of the playing area, wherein the two-dimensional representation of the playing area is presented on the display contiguous with the real world background scene and completely within the outside edges of the real world background scene on the display, and wherein the two-dimensional representation of the playing area is partially transparent to permit viewing a portion of the real world background scene through the two-dimensional representation of the playing area;
wherein the series of video clips of the real person, and the three-dimensional representation of the playing area, and the two-dimensional representation of the playing area are presented in separate nonoverlapping areas within the outside edges of the real world background scene;
wherein the real world background scene and the series of video clips of the real person and the three-dimensional representation of the playing area and the two-dimensional representation of the playing area are visible substantially simultaneously on the display;

wherein the two-dimensional representation of the playing area and the three-dimensional representation of the playing area show a same state of the interaction, and wherein the two-dimensional representation of the playing area shows all movement shown in the three-dimensional representation of the playing area;

inputting a human operator's choice of action or inaction to a situation state module;

updating a current state based on the human operator's action or inaction;

using the current state by a decision logic to determine how to control the real world background scene;

sending a selection of control of the real world background scene to the display;

using a series of triggers to control responses of the image of the real person presented on the display, wherein the responses are continuous and are determined by game situations, wherein the game situations include actions and inaction by the human operator, and include the time between moves by the human operator, and the human operator's sequence of moves during a game, and the human operator's strategic position in the game, and wherein the responses of the image of the real person include movements both during and between game moves of the image of the real person and of the human operator;

modifying the image of the real person presented on the display;

providing motion of the image of the real person presented on the display in a time-dependent manner based on interaction with the human operator;

wherein controlling the responses of the image of the real person presented on the display comprises using a library of videos and interacting decision logic with a video controller;

wherein the decision logic uses the current state to determine the response by the image of the real person presented on the display;

wherein the operation of presenting on the display a series of concatenated pictures of the real world to provide a real world background scene having life-like movement comprises continuously streaming video;

wherein the two-dimensional representation of the playing area is a top-down view; and wherein the series of video clips of the real person are presented on the display contiguous with a portion of the three-dimensional representation of the playing area.

37. The method of claim 36, wherein the interaction is a game, and wherein the playing area includes a playing board, and wherein the playing area further includes playing pieces.

38. The method of claim 37, wherein the two-dimensional representation of the playing area and the three-dimensional representation of the playing area show the state of the interaction.

39. The method of claim 38, wherein the two-dimensional representation of the playing area and the three-dimensional representation of the playing area include the positions of the pieces on the playing board representing the state of the game.

40. The method of claim 39, wherein the two-dimensional representation of the playing area shows all corresponding movement in both time and space from the game shown in the three-dimensional representation.

41. The method of claim 40, wherein the three-dimensional representation of the playing area and the two-dimensional representation of the playing area are not contiguous on the display.

42. A method for presenting a virtual reality setting for an interaction, the method comprising the following operations:

presenting on a display a series of concatenated pictures of the real world to provide a real world background scene having life-like movement;

presenting on the display a series of video clips of a real person, wherein the series of video clips present the appearance of a continuous and moving image of the real person on the display; wherein the series of video clips of the real person are presented on the display contiguous with the real world background scene and completely within outside edges of the real world background scene on the display;

presenting on the display a three-dimensional representation of a playing area, wherein the three-dimensional representation of the playing area is presented on the display contiguous with the real world background scene and completely within the outside edges of the real world background scene on the display;

presenting on the display a two-dimensional representation of the playing area, wherein the two-dimensional representation of the playing area is presented on the display contiguous with the real world background scene and completely within the outside edges of the real world background scene on the display, and wherein the two-dimensional representation of the playing area is partially transparent to permit viewing a portion of the real world background scene through the two-dimensional representation of the playing area;

wherein the series of video clips of the real person, and the three-dimensional representation of the playing area, and the two-dimensional representation of the playing area are presented in separate nonoverlapping areas within the outside edges of the real world background scene;

wherein the real world background scene and the series of video clips of the real person and the three-dimensional representation of the playing area and the two-dimensional representation of the playing area are visible substantially simultaneously on the display;

inputting a human operator's choice of action or inaction to a situation state module;

updating a current state based on the human operator's action or inaction;

using the current state by a decision logic to determine how to control the real world background scene;

using the current state by the decision logic to determine a response by the image of the real person presented on the display; and modifying the image of the real person presented on the display.

43. The method of claim 42, wherein the interaction is a game.

44. The method of claim 43, image of the real person is an opponent in the game.

45. The method of claim 44, the three-dimensional representation of the playing area and the two-dimensional representation of the playing area are not contiguous.

46. The method of claim 45, wherein the series of video clips of the real person are presented on the display contiguous with a portion of the three-dimensional representation of the playing area.

47. The method of claim 46, further comprising the operation of controlling the image of the real person in response to actions of the human operator.

48. The method of claim 47, further comprising the operation of controlling the image of the real person in response to inaction of the human operator.

49. The method of claim 48, further comprising the operation of continuously controlling the image of the real person in response to actions and inaction of the human operator.

50. The method of claim 49, further comprising the operation of controlling the image of the real person in response to the time between moves by the human operator.

51. The method of claim 50, further comprising the operation of affecting the situation state of the setting responsive to an action or to inaction by the human operator.

52. The method of claim 51, further comprising the operation of using a series of triggers to control the image of the real person with responses that are different depending on a game situation.

53. The method of claim 52, further comprising the operation of using a series of triggers to control the image of the real person with responses that are different depending on the game situation, and wherein the responses include movements both during and between game moves of the image of the real person and a human operator.

54. The method of claim 53, further comprising the operation of using triggers to control responses of the image of the real person, wherein the triggers include the human operator's sequence of moves during the game.

55. The method of claim 54, further comprising the operation of using triggers to control responses of the image of the real person, wherein the triggers include the human operator's strategic position in the game.

56. The method of claim 55, further comprising the operation of using a current situation state of the interaction to determine a response in the setting by the image of the real person, wherein the image of the real person is a computer-controlled player in the game.

57. The method of claim 56, further comprising the operation of interacting the decision logic with a video controller to modify the image of the real person.

58. The method of claim 57, further comprising the operation of modifying the image of the real person by making a direct change to the image of the real person.

59. The method of claim 57, further comprising the operation of modifying the image of the real person using a library of videos.

60. The method of claim 59, further comprising presenting words on the display completely within the outside edges of the background scene on the display.

61. The method of claim 30, wherein the character is an animated character, and wherein the animation is a cartoon.

62. The method of claim 60, wherein the interaction is a board game.

63. The method of claim 62, wherein the two-dimensional representation of the playing area and the three-dimensional representation of the playing area show a same state of the interaction, and wherein the two-dimensional representation of the playing area shows all movement shown in the three-dimensional representation of the playing area.

64. The method of claim 63, wherein the real world background scene includes trees, grass, and a sky.

65. The method of claim 64, further comprising the operation of putting the human operator's course of action in place and sending it to the display.

66. The method of claim 65, wherein the interaction is a game of checkers.

67. The method of claim 66, further comprising the operation of putting a selection of a control of the image of the real person and a selection of a control of the real world background scene in place, and sending the selected controls to the display.

68. The method of claim 67, wherein the operations further comprise presenting text on the display indicating a player's turn in the game, wherein the text is presented completely within the outside edges of the real world background scene on the display, and wherein the text is presented on the display above the two-dimensional representation of the playing area.

69. The method of claim 68, further comprising the operation of relating the current state and current triggers to a course of action and to videos to determine the most appropriate update to the setting.

70. The method of claim 69, further comprising the operation of presenting courses of action to the display after utilizing the decision logic, wherein the decision logic is a computer algorithm.

71. The method of claim 70, further comprising the operation of interacting with a video controller to modify the image of the real person and the real world background scene in the environment after utilizing the decision logic.

72. The method of claim 42, wherein the operation of presenting the background comprises continuously streaming video.

73. The method of claim 71, further comprising the operation of providing information regarding a current situational state on the display.

74. The method of claim 73, wherein the interaction is a game, and wherein the playing area includes a playing board, and wherein the playing area further includes playing pieces.

75. The method of claim 74, wherein the two-dimensional representation of the playing area and the three-dimensional representation of the playing area include the state of the interaction.

76. The method of claim 75, wherein the two-dimensional representation of the playing area and the three-dimensional representation of the playing area include the positions of the pieces on the playing board representing the state of the game.

77. The method of claim 76, wherein the three-dimensional representation of the playing area is a view as would be seen in real-life from a player's perspective.

78. The method of claim 77, wherein the two-dimensional representation of the playing area is a top-down view of the playing area.

79. The method of claim 78, wherein the two-dimensional representation of the playing area shows all corresponding movement in both time and space from the game shown in the three-dimensional representation.

80. A method for presenting a digital environment for an interaction, the method comprising the following operations:

presenting on a display a series of concatenated pictures of the real world to provide a real world background scene having life-like movement;

presenting on the display a series of video clips of a real person, wherein the series of video clips present the appearance of a continuous and moving image of the real person on the display; wherein the series of video clips of the real person are presented on the display contiguous with the real world background scene and completely within outside edges of the real world background scene on the display;

presenting on the display a three-dimensional representation of a playing area, wherein the three-dimensional representation of the playing area is presented on the display contiguous with the real world background scene and completely within the outside edges of the real world background scene on the display;

presenting on the display a two-dimensional representation of the playing area, wherein the two-dimensional representation of the playing area is presented on the display contiguous with the real world background scene and completely within the outside edges of the real world background scene on the display, and wherein the two-dimensional representation of the playing area is partially transparent to permit viewing a portion of the real world background scene through the two-dimensional representation of the playing area;

wherein the series of video clips of the real person, and the three-dimensional representation of the playing area, and the two-dimensional representation of the playing area are presented in separate nonoverlapping areas within the outside edges of the real world background scene;

wherein the real world background scene and the series of video clips of the real person and the three-dimensional representation of the playing area and the two-dimensional representation of the playing area are visible substantially simultaneously on the display;

wherein the two-dimensional representation of the playing area and the three-dimensional representation of the playing area show a same state of the interaction, and wherein the two-dimensional representation of the playing area shows all movement shown in the three-dimensional representation of the playing area;

inputting an operator's choice of action or inaction;

updating a current state based on the operator's action or inaction;

using the current state by a decision logic to determine a response in the environment by the image of the real person; and modifying the image of the real person using a library of videos.

81. The method of claim 80, further comprising the operations of:

using the current state by the decision logic to determine how to control the real world background scene in the environment;

interacting with a video controller to modify the background after utilizing the decision logic; and sending a selection of control of the background to the display.

82. The method of claim 81, wherein the operation of presenting the background comprises continuously streaming video.

83. The method of claim 82, wherein the series of video clips of the real person are presented on the display contiguous with a portion of the three-dimensional representation of the playing area.

84. A method for presenting a virtual reality environment for an interaction, the method comprising the following operations:

presenting on a display a series of concatenated pictures of the real world to provide a real world background scene having life-like movement;

presenting on the display a series of video clips of a real person, wherein the series of video clips present the appearance of a continuous and moving image of the real person on the display; wherein the series of video clips of the real person are presented on the display contiguous with the real world background scene and completely within outside edges of the real world background scene on the display;

presenting on the display a three-dimensional representation of a playing area, wherein the three-dimensional representation of the playing area is presented on the display contiguous with the real world background scene and completely within the outside edges of the real world background scene on the display;

presenting on the display a two-dimensional representation of the playing area, wherein the two-dimensional representation of the playing area is presented on the display contiguous with the real world background scene and completely within the outside edges of the real world background scene on the display, and wherein the two-dimensional representation of the playing area is partially transparent to permit viewing a portion of the real world background scene through the two-dimensional representation of the playing area;

wherein the series of video clips of the real person, and the three-dimensional representation of the playing area, and the two-dimensional representation of the playing area are presented in separate nonoverlapping areas within the outside edges of the real world background scene;

wherein the real world background scene and the series of video clips of the real person and the three-dimensional representation of the playing area and the two-dimensional representation of the playing area are visible substantially simultaneously on the display;

wherein the two-dimensional representation of the playing area and the three-dimensional representation of the playing area show a same state of the interaction, and wherein the two-dimensional representation of the playing area shows all movement shown in the three-dimensional representation of the playing area;

inputting an operator's choice of action or inaction;

updating a current state based on the operator's action or the operator's inaction;

using the current state by a decision logic to determine a response by the image of the real person; and modifying the image of the real person; and wherein the interaction is a game, and wherein the playing area includes a playing board, and wherein the playing area further includes playing pieces.

85. The method of claim 84, further comprising the following operations:

using the current state by the decision logic to determine how to control the background in the environment; and interacting with a video controller to modify the background after the decision logic uses the current state.

86. The method of claim 85,
wherein the three-dimensional representation of the playing area and the two-dimensional representation of the playing area are not contiguous on the display.

87. A method for presenting a virtual reality setting for an interaction, the method comprising the following operations:
  presenting on a display a series of concatenated pictures of the real world to provide a real world background scene having life-like movement;
  presenting on the display a series of video clips of a real person, wherein the series of video clips present the appearance of a continuous and moving image of the real person on the display; wherein the series of video clips of the real person are presented on the display contiguous with the real world background scene and completely within outside edges of the real world background scene on the display;
  presenting on the display a three-dimensional representation of a playing area, wherein the three-dimensional representation of the playing area is presented on the display contiguous with the real world background scene and completely within the outside edges of the real world background scene on the display;
  presenting on the display a two-dimensional representation of the playing area, wherein the two-dimensional representation of the playing area is presented on the display contiguous with the real world background scene and completely within the outside edges of the real world background scene on the display, and wherein the two-dimensional representation of the playing area is partially transparent to permit viewing a portion of the real world background scene through the two-dimensional representation of the playing area;
  wherein the series of video clips of the real person, and the three-dimensional representation of the playing area, and the two-dimensional representation of the playing area are presented in separate nonoverlapping areas within the outside edges of the real world background scene;
  wherein the real world background scene and the series of video clips of the real person and the three-dimensional representation of the playing area and the two-dimensional representation of the playing area are visible substantially simultaneously on the display;
  wherein the two-dimensional representation of the playing area and the three-dimensional representation of the playing area show a same state of the interaction, and wherein the two-dimensional representation of the playing area shows all movement shown in the three-dimensional representation of the playing area;
  inputting an operator's choice of action or inaction;
  updating a current state based on the operator's action or inaction;
  using the current state by a decision logic to determine a response in the virtual reality setting by the image of the real person; and
  using the current state by the decision logic to determine a selection of how to control the image of the real person on the display and how to control the real world background scene on the display; and
  wherein the interaction is a board game, and wherein the playing area includes a playing board, and wherein the playing area further includes playing pieces.

88. The method of claim 87,
wherein the series of video clips of the real person are presented on the display contiguous with a portion of the three-dimensional representation of the playing area.

* * * * *

UNITED STATES PATENT AND TRADEMARK OFFICE
CERTIFICATE OF CORRECTION

| | | |
|---|---|---|
| PATENT NO. | : 7,084,876 B1 | Page 1 of 3 |
| APPLICATION NO. | : 10/623034 | |
| DATED | : August 1, 2006 | |
| INVENTOR(S) | : Fogel et al. | |

It is certified that error appears in the above-identified patent and that said Letters Patent is hereby corrected as shown below:

In the Drawings

Title page, illustrative fig. 1 should be deleted and substitute therefore the attached title page consisting of illustrative fig. 1.

The drawing sheet 2 consisting of Fig(s) 1 should be deleted and substitute therefore the attached drawing sheet 2 consisting of Fig(s) 1.

Signed and Sealed this
Fourteenth Day of August, 2012

David J. Kappos
*Director of the United States Patent and Trademark Office*

(12) United States Patent
Fogel et al.

(10) Patent No.: US 7,084,876 B1
(45) Date of Patent: Aug. 1, 2006

(54) METHOD FOR PRESENTING A VIRTUAL REALITY ENVIRONMENT FOR AN INTERACTION

(75) Inventors: David B. Fogel, San Diego, CA (US); Douglas R. Johnson, San Diego, CA (US); Timothy J. Hays, La Jolla, CA (US)

(73) Assignee: Digenetics, Inc., La Jolla, CA (US)

( * ) Notice: Subject to any disclaimer, the term of this patent is extended or adjusted under 35 U.S.C. 154(b) by 369 days.

(21) Appl. No.: 10/623,034

(22) Filed: Jul. 18, 2003

Related U.S. Application Data

(60) Provisional application No. 60/431,679, filed on Dec. 7, 2002.

(51) Int. Cl.
*G06T 13/00* (2006.01)

(52) U.S. Cl. .................. 345/473; 463/32; 715/706
(58) Field of Classification Search .......... 345/473; 463/2, 14, 32; 715/758, 706
See application file for complete search history.

(56) References Cited

U.S. PATENT DOCUMENTS

| | | | |
|---|---|---|---|
| 4,766,541 A * | 8/1988 | Bleich et al. | 463/31 |
| 5,682,469 A * | 10/1997 | Linnett et al. | 345/473 |
| 6,168,519 B1 * | 1/2001 | Nakagawa et al. | 463/4 |
| 6,600,491 B1 * | 7/2003 | Szeliski et al. | 345/473 |
| 6,676,518 B1 * | 1/2004 | Sawa et al. | 463/31 |
| 6,798,426 B1 * | 9/2004 | Tateishi | 715/706 |

FOREIGN PATENT DOCUMENTS

JP 10201954 A * 8/1998

OTHER PUBLICATIONS

Arno Schödl, Richard Szeliski, David H. Salesin, Irfan Essa, "Video textures," Jul. 2000, Proceedings of the 27th Annual Conference on Computer Graphics and Interactive Techniques, p. 489-498.*

Stephen Pollard, Sean Hayes, "3D Video Sprites," Feb. 1998, HPL-98-25, HP Labs Technical Report.*

Fogel, David, declaration, Aug. 4, 2004, 4 pages plus Exhibits A, B, C, D, E, F, G, H.

(Continued)

*Primary Examiner*—Ulka Chauhan
*Assistant Examiner*—Jason M. Repko
(74) *Attorney, Agent, or Firm*—Timothy N. Ellis

(57) ABSTRACT

One aspect of the invention is a method for presenting a virtual reality setting for an interaction. An example of the method includes presenting a streaming video of a real-world background scene, and presenting a series of individual video clips that are joined into the appearance of a continuous streaming image of a real-world character. The method also includes inputting an operator's choice of action or inaction, and updating a current state based on the operator's action or inaction. The method further includes using the current state by a decision logic to determine a response in the setting by the character, and using the current state by the decision logic to determine a selection of how to control video of the character and how to control video of the background. The method may also include simultaneously presenting a three-dimensional representation and a two-dimensional representation of a playing area.

88 Claims, 2 Drawing Sheets

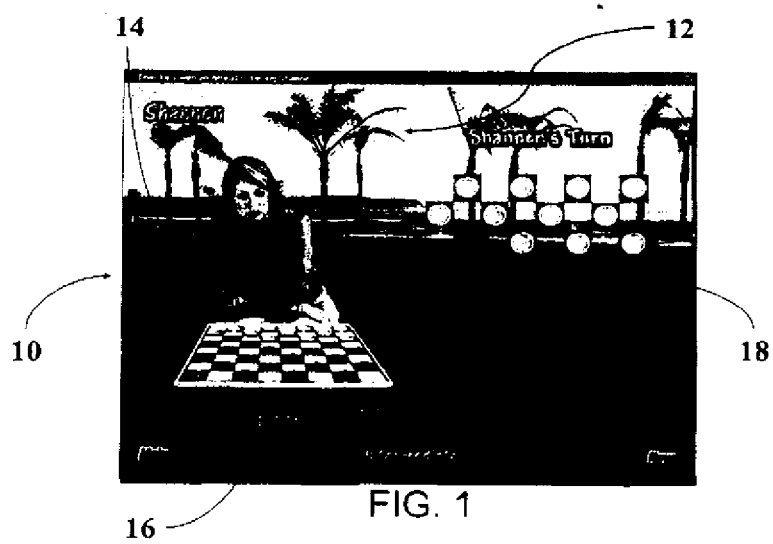

FIG. 1